(No Model.)
T. B. FAGAN.
WHEEL HARROW.
No. 323,132. Patented July 28, 1885.
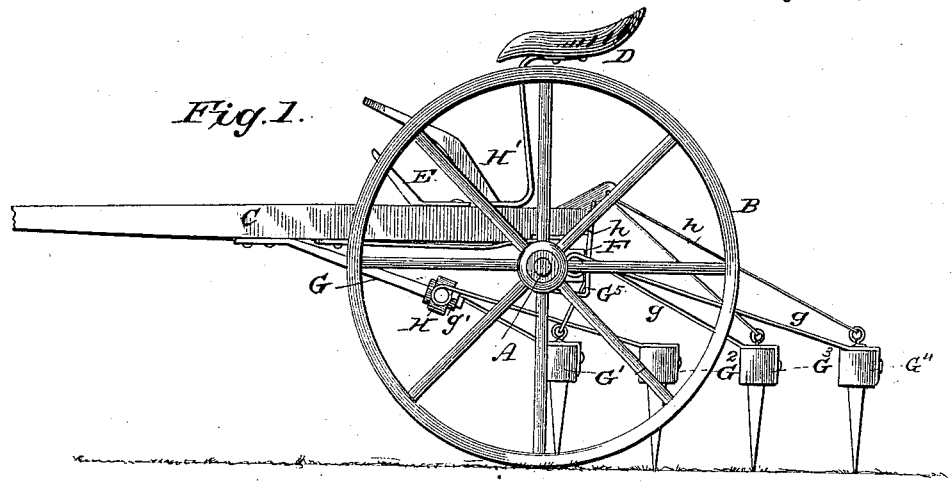
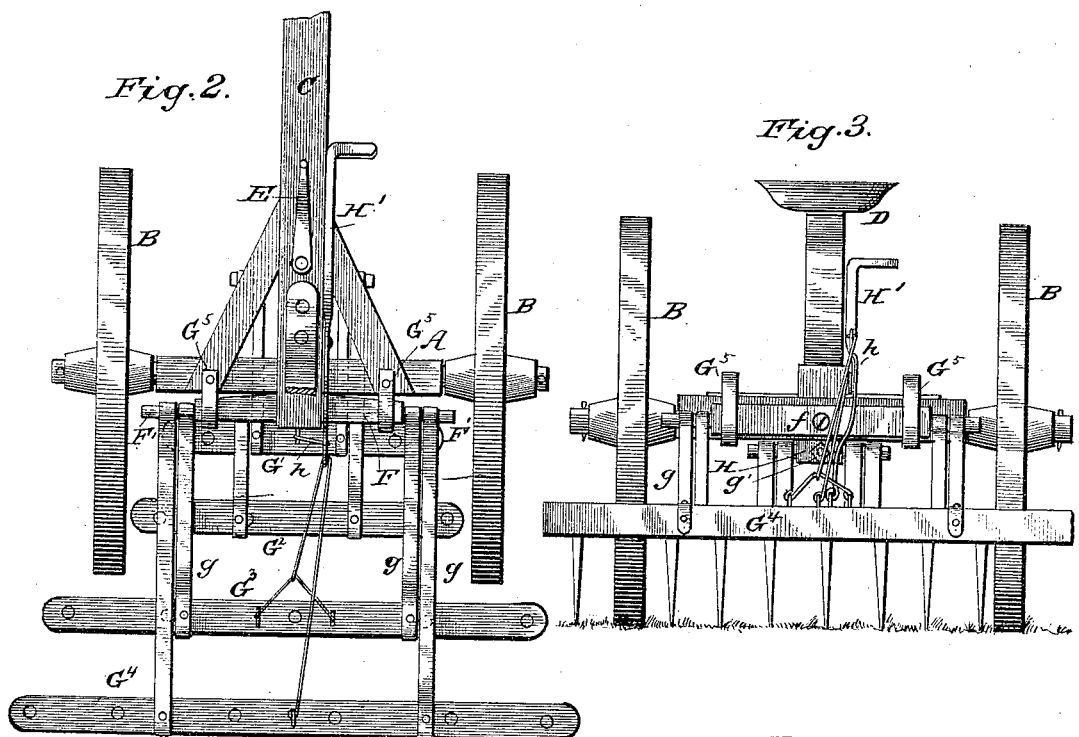
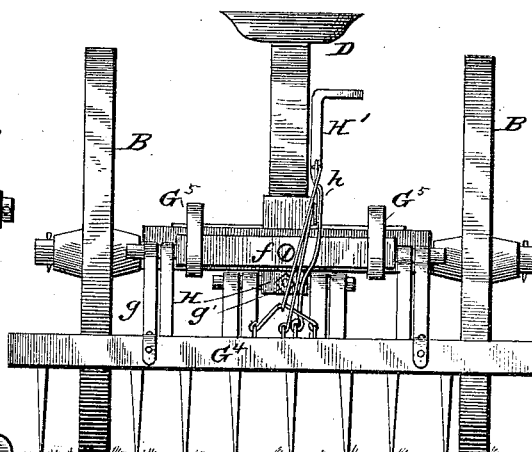
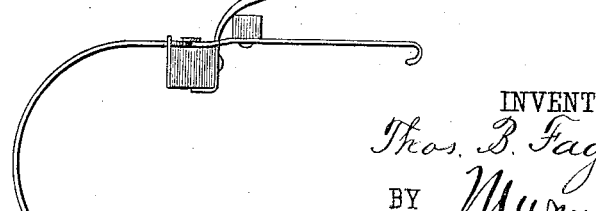
WITNESSES:
Fred. G. Dieterich
P. B. Turpin
INVENTOR:
Thos. B. Fagan
BY Munn & Co
ATTORNEYS.

United States Patent Office.

THOMAS BRODRICK FAGAN, OF VAN WERT, OHIO.

WHEEL-HARROW.

SPECIFICATION forming part of Letters Patent No. 323,132, dated July 28, 1885.

Application filed May 12, 1885. (No model.)

*To all whom it may concern:*

Be it known that I, THOMAS B. FAGAN, a citizen of the United States, residing at Van Wert, in the county of Van Wert and State of Ohio, have invented certain new and useful Improvements in Harrows, of which the following is a description.

This invention is an improvement in wheel-harrows; and it consists in certain novel constructions and combinations of parts, as will be hereinafter more fully described and claimed.

In the drawings, Figure 1 is a side elevation, Fig. 2 a top plan view, and Fig. 3 a rear elevation of my machine; and Fig. 4 is a detail side view of the raking attachment, all of which will be described.

The carriage is formed with an axle-beam, A, bearing the wheels B and having the tongue C fixed to it. On this carriage I mount the driver's seat D, and in front of this seat I pivot a latch, E, which may be turned on its pivot so as to project over the lever presently described. The main supporting or evener-bar F is pivoted at $f$, centrally between its ends to the axle-beam, so the said bar can rock on said pivot in a vertical plane. Keepers $G^5$ are supported on the axle-beam and fit over the supporting-bar near its ends. These keepers are made sufficiently long to permit the desired rocking of the supporting-bar, and at the same time limit the movement of said bar within proper bounds. This bar F has its ends formed with suitable spindle portions F', on which to journal the ends of the hangers by which the toothed frames are supported. To the tongue in front of the axle I secure a supporting-shaft, G, which projects down and is inclined to the rear, as shown. The lower end of this shaft is threaded to receive the nut $g$, or otherwise suitably adapted to secure the secondary evener or supporting-bar H thereon. The toothed frames G' G² G³ G⁴ are made of different lengths, gradually increasing from front to rear, so that each frame will harrow slightly wider than the one next in front. The number of these frames may be varied, as desired. To them I fix one end of hanger straps or bars $g$, the other ends of which are journaled on the spindles of the supporting-bars, so the frames may rise or fall, and by the pivotal connection of the evener-bars the opposite ends of the frames may rise independently to pass over obstructions.

For convenience of reference I denominate the evener-bar in front of the axle the "supplemental" bar and the one in rear the "main" bar.

To the axle-bar I pivot the lever H', the rear end of which is connected by links $h$ with the tooth-frames, and the forward end of which is arranged in position to be engaged by the driver's foot, and may, when depressed, be held by the latch which is suitably arranged to be turned over it. It will be noticed that the main and supplemental toothed frames may by this lever be raised clear of the ground when moving the machine from place to place. It will also be noticed that by the connection of the main and supplemental frames, one in advance and the other in rear of the axle-beam, up and down pressure on the tongue will be removed in great part from the horse's neck, as the axle-beam will serve as a pivotal point and the draft on the frames in front and rear thereof will equalize to a great extent the rotary strain thereon.

The form of the teeth may be varied to suit the purposes to which it is intended to apply the machine.

In Fig. 4 I have shown a frame adapted for use as a rake, which may be conveniently substituted for the harrow-frames, as will be understood.

In the use of the rake, instead of the pivoted elevated lever, an arm, I, is usually fixed at one end to the rake-frame, and may have its other end held by the latch when depressed to elevate the rake.

Having thus described my invention, what I claim as new is—

1. The combination of the carriage having an axle-beam, the main supporting-bar pivoted between its ends in rear of the axle-beam, the supplemental supporting-bar pivoted between its ends in front of the axle-beam, and the toothed frames having their hangers supported on the opposite ends of said supporting-bars, substantially as set forth.

2. The improved harrow herein described, consisting of the carriage having an axle-beam and a tongue, the main supporting-bar pivoted between its ends to the rear side of the axle-beam, vertically-elongated keepers fixed to the axle-beam and embracing the opposite ends of the main supporting-bar, the shaft depending and inclined rearwardly from the tongue in advance of the beam, the supplemental supporting-bar pivoted between its ends on the said shaft, the toothed frames having hangers journaled at their upper ends to the opposite ends of the supporting-bars, the lever pivoted to the carriage, and the links connecting said lever with the toothed frames, substantially as set forth.

3. The combination of a supporting-bar pivoted between its ends, a plurality of toothed bars arranged one in rear of the other, and hangers connecting the said bars, the hangers of one toothed bar being arranged between those of the adjacent one, substantially as set forth.

4. The combination, in a wheel-harrow, of the carriage, a shaft, G, supported thereon, a bar, H, pivoted between its ends to said shaft, a bar, F, pivoted between its ends to the carriage in rear of the bar H, and toothed frames having hangers supported from said bars H and F, substantially as set forth.

THOMAS BRODRICK FAGAN.

Witnesses:
AMOS T. DAILEY,
OSCAR A. BALYEAT.